US012608645B1

(12) United States Patent
Nesbitt et al.

(10) Patent No.: US 12,608,645 B1
(45) Date of Patent: Apr. 21, 2026

(54) MACHINE LEARNING PLATFORM AND PIPELINE FOR EFFICIENT DATA PROCESSING

(71) Applicant: Humana Inc., Louisville, KY (US)

(72) Inventors: Keegan Nesbitt, Louisville, KY (US); David Christopher Mack, Louisville, KY (US); Rajagopal Subramanian, Plano, TX (US); Brent Sundheimer, Louisville, KY (US); Xinyu Liu, Boston, MA (US); Suresh Venkatesan, Plano, TX (US); Suresh Siva, Boston, MA (US)

(73) Assignee: Humana Inc., Louisville, KY (US)

( * ) Notice: Subject to any disclaimer, the term of this patent is extended or adjusted under 35 U.S.C. 154(b) by 975 days.

(21) Appl. No.: 17/751,569

(22) Filed: May 23, 2022

Related U.S. Application Data

(60) Provisional application No. 63/192,965, filed on May 25, 2021.

(51) Int. Cl.
*G06N 20/00* (2019.01)
*G06F 8/33* (2018.01)
(Continued)

(52) U.S. Cl.
CPC ............... *G06N 20/00* (2019.01); *G06F 8/33* (2013.01); *G06F 8/35* (2013.01); *G06F 8/36* (2013.01); *G06F 11/3428* (2013.01)

(58) Field of Classification Search
CPC .. G06N 20/00; G06F 8/33; G06F 8/35; G06F 8/36; G06F 11/3428
(Continued)

(56) References Cited

U.S. PATENT DOCUMENTS

| | | | |
|---|---|---|---|
| 11,227,188 B2 * | 1/2022 | Nguyen | G06F 18/2148 |
| 11,620,568 B2 * | 4/2023 | Moghadam | G06N 3/045 |
| | | | 706/12 |

(Continued)

OTHER PUBLICATIONS

Boehm, Matthias, et al. "SystemDS: A declarative machine learning system for the end-to-end data science lifecycle." arXiv preprint arXiv: 1909.02976 (2019). pp. 1-8. (Year: 2019).*

(Continued)

*Primary Examiner* — Satish Rampuria
(74) *Attorney, Agent, or Firm* — Standley Law Group LLP; Jeffrey S. Standley; James L. Kwak

(57) ABSTRACT

A system enables agile model development to speed up innovation by data scientists. Model training and deployment are coordinated and standardized to reduce redundancy. Data is obtained for feature generation and reformatted and de-sensitized for storage. The features are stored in locations available to all models and training modules of a system so data does not need to be adjusted for new models. To generate a machine learning model, the system establishes a cohort for evaluation by the model. A model template and features for use by the model are identified. The selected template and features are used for experimentation and evaluation. Model training artifacts, such as model weights are subsequently recorded in a model store and the model scripts and settings can then be registered in a centralized database where it can be accessed for execution.

10 Claims, 7 Drawing Sheets

(51) Int. Cl.
    *G06F 8/35*     (2018.01)
    *G06F 8/36*     (2018.01)
    *G06F 11/34*    (2006.01)

(58) Field of Classification Search
    USPC ................................................. 717/168–178
    See application file for complete search history.

(56)                    References Cited

U.S. PATENT DOCUMENTS

| | | | | |
|---|---|---|---|---|
| 2020/0090075 | A1* | 3/2020 | Achin ................ | G06Q 30/0201 |
| 2020/0125956 | A1* | 4/2020 | Ravi ......................... | G06N 3/09 |
| 2021/0390455 | A1* | 12/2021 | Schierz .................. | G06N 20/00 |
| 2022/0083840 | A1* | 3/2022 | Luong .................... | G06N 20/00 |
| 2023/0101955 | A1* | 3/2023 | Vo ........................... | G06N 20/00 |
| | | | | 706/12 |
| 2024/0232690 | A9* | 7/2024 | Yogaraj .................. | G06N 20/00 |

OTHER PUBLICATIONS

Agrawal, Pulkit, et al. "Data platform for machine learning." Proceedings of the 2019 international conference on management of data. 2019. pp. 1803-1816. (Year: 2019).*
Jordan, Michael I., and Tom M. Mitchell. "Machine learning: Trends, perspectives, and prospects." Science 349.6245 (2015): pp. 255-260. (Year: 2015).*
Roh, Yuji, Geon Heo, and Steven Euijong Whang. "A survey on data collection for machine learning: a big data-ai integration perspective." IEEE Transactions on Knowledge and Data Engineering 33.4 (2019): pp. 1328-1347. (Year: 2019).*
Karpatne, Anuj, et al. "Theory-guided data science: A new paradigm for scientific discovery from data." IEEE Transactions on knowledge and data engineering 29.10 (2017): pp. 2318-2331. (Year: 2017).*
Dhar, Vasant. "Data science and prediction." Communications of the ACM 56.12 (2013): pp. 64-73. (Year: 2013).*

* cited by examiner

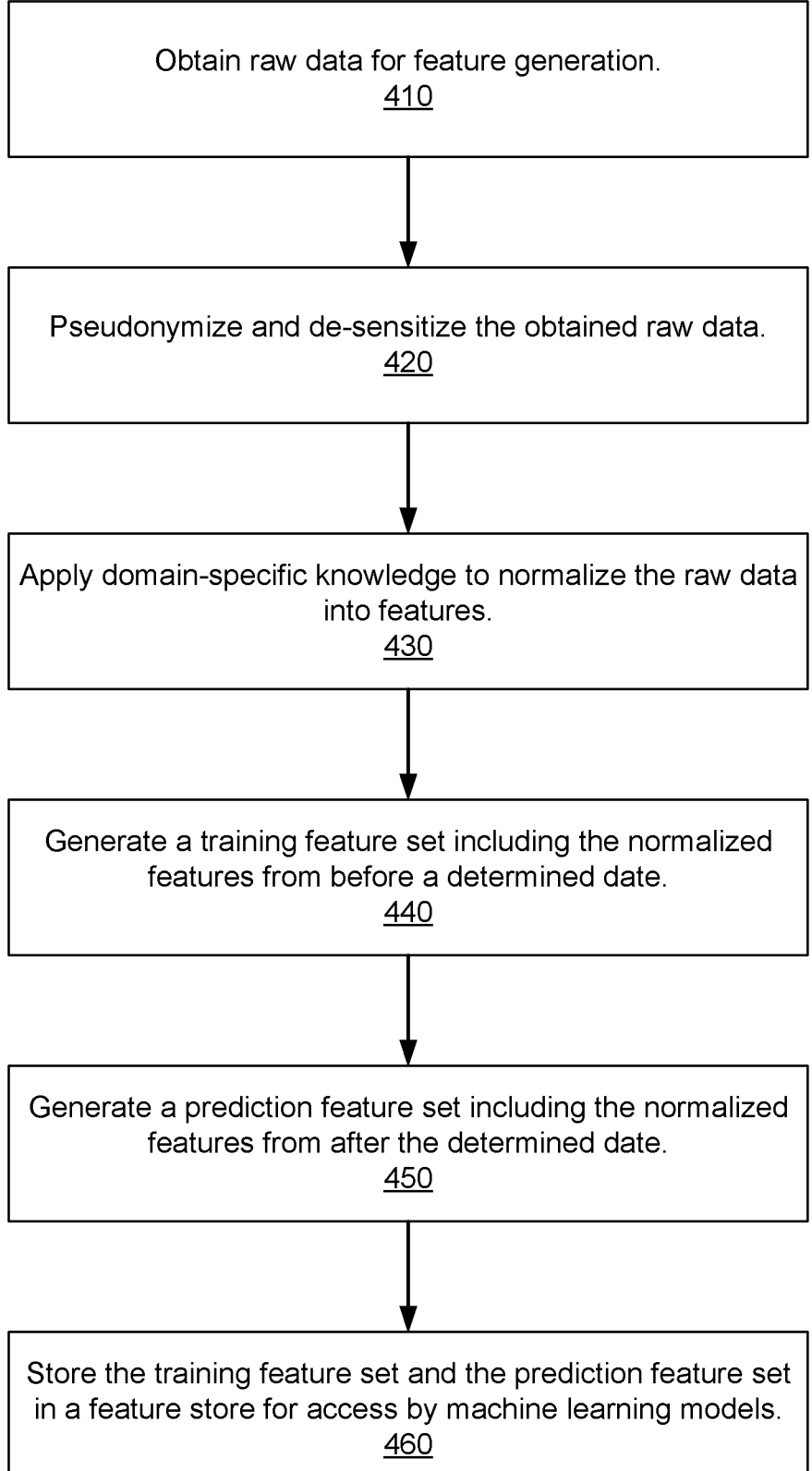

Obtain raw data for feature generation.
410

Pseudonymize and de-sensitize the obtained raw data.
420

Apply domain-specific knowledge to normalize the raw data into features.
430

Generate a training feature set including the normalized features from before a determined date.
440

Generate a prediction feature set including the normalized features from after the determined date.
450

Store the training feature set and the prediction feature set in a feature store for access by machine learning models.
460

FIG. 4

MACHINE LEARNING PLATFORM AND PIPELINE FOR EFFICIENT DATA PROCESSING

CROSS REFERENCE TO RELATED APPLICATIONS

This application claims the benefit of U.S. Provisional Application No. 63/192,965, filed May 25, 2021, which is hereby incorporated by reference in its entirety.

BACKGROUND

Field of Art

This disclosure relates generally to machine learning techniques and more particularly to generation of standardized machine learning model pipelines.

Description of Art

Data scientists develop machine learning tools. Typically, in a process of data model development, data scientists spend most of their development time on processes of data cleansing and feature engineering. Given that many developers use common data sets, this leads to a large amount of redundant work where multiple data scientists may be cleaning and preparing the same data sets for use in models. In the deployment side, data scientists often develop models and then give the models to software engineers for deployment. The software engineers can further reproduce work such as data preparation and model development in this deployment lifecycle.

In a certain settings, the types of machine learning models that may be developed are unbounded. It becomes a much more complicated problem than in other spaces that may be focused on a smaller set of models and/or a smaller set of data sources. For example, a system may require development of consumer-oriented machine learning models, provider-oriented machine learning models, and the like.

SUMMARY

A system and method described herein enables agile model development to speed up innovation by data scientists. The system described herein is also flexible in that it can take advantage of cloud platforms to expand or contract computing time and resources as needed.

The system coordinates model training and model deployment to reduce redundancy. Raw data is obtained for feature generation and is reformatted and de-sensitized for storage. The features are stored in locations available to all models and training modules of the system so that data scientists and engineers do not have to re-format data each time they train or adjust a model. In some cases, domain-specific knowledge is used to normalize feature values. A training feature set is generated based on data from before a score date. A corresponding prediction feature set is generated based on data from after the score date. These feature sets can then be used for training and/or deployment of machine learning models.

To generate a machine learning model with reduced redundancy, the system establishes a cohort for evaluation by the model. A model template and features for use by the model are identified. The selected template and the standardized features are used for experimentation and evaluation, and changes may be made to the model such as adjustments to model weights until the model is determined to be at acceptable levels of accuracy and fairness. Model training artifacts, such as model weights are subsequently recorded in a model store and the model scripts and settings can then be registered in a centralized database where it can be accessed for execution.

The features and advantages described in this summary and the following detailed description are not limiting and not all-inclusive. Many additional features and advantages will be apparent to one of ordinary skill in the art in view of the drawings, specification, and claims hereof.

BRIEF DESCRIPTION OF THE DRAWINGS

FIG. 4 is a flowchart illustrating a method of producing features for use by the models, in accordance with one example embodiment.

Figure 1:
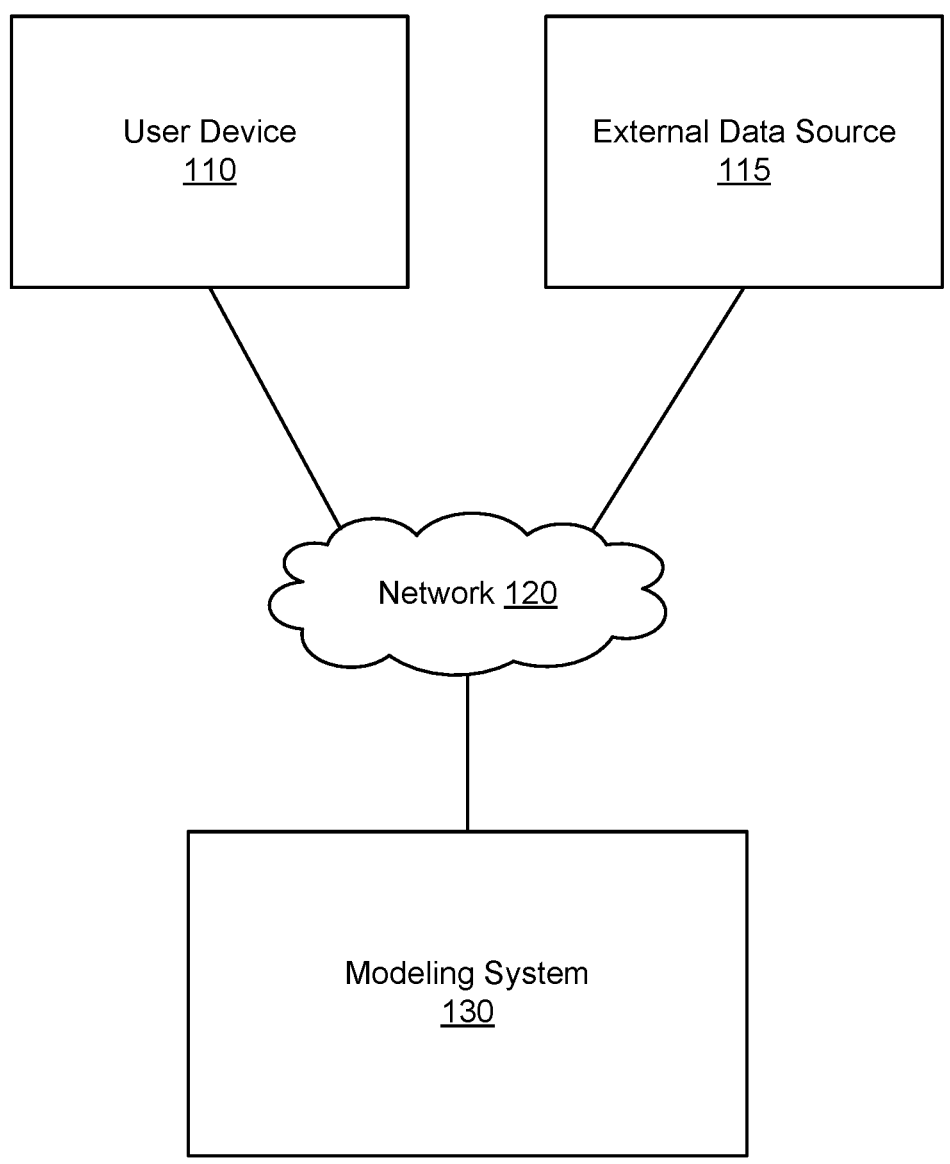
FIG. 1 is a high level block diagram of a system environment for a modeling system, in accordance with an example embodiment.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

FIG. 1 is a high level block diagram of a system environment for a modeling system, in accordance with an example embodiment. The system environment includes a user device 110, an external data source 115, a network 120, and a modeling system 130. For clarity, only one user device 110 is shown in FIG. 1 and only one external data source 115 is shown in FIG. 1. Alternate embodiments of the system environment can have any number of user devices and any number of external data sources 115 as well as multiple modeling systems 130. The functions performed by the various entities of FIG. 1 may vary in different embodiments. The modeling system 130 generates normalized and preprocessed feature data to be used for training machine learning models. The features generated by the modeling system 130 can also be used as inputs into models in production. Since the modeling system 130 can be configured to update the available features periodically or as additional raw data is received, the modeling system facilitates efficient access to current and standardized features for data scientists and augmented intelligence (AI) engineers who are developing and implementing machine learning models. For example, features may be updated hourly, daily, weekly, monthly, or at another interval depending on the type of feature. In addition to generating standardized features, the modeling system 130 facilitates self-service custom feature generation, model training, monitoring and registration, and generation of model templates.

Data scientists, AI engineers, and other users may interact with the modeling system 130 via a user device 110. For example, data scientists may use a user device 110 to configure templates for new models, to make feature selections, and to interact with model experiments. As another example, AI engineers may use a user device 110 to promote a trained model to production and to schedule executions of the models. User devices 110 can be computing devices such as desktop computers, servers, tablets, notebook computers, or smartphones. In some embodiments, a user may be able to interact directly with the modeling system 130.

External data sources 115 may be any source from which processed or raw data is provided to the modeling system 130. External data sources 115 may take the form of servers, desktop computers, tablets, notebook computers, smartphones, or other computing devices that can transmit data to the modeling system 130. Examples of external data sources 115 in the healthcare space include laboratories, insurance claim databases, electronic health records, and member profile repositories. Different external data sources 115 may provide data in various formats and schemas.

The user devices 110 and external data sources 115 can communicate with the modeling system 130 via the network 120 which may comprise any combination of local area and wide area networks employing wired or wireless communication links. In some embodiments, all or some of the communication on the network 120 may be encrypted.

Figure 2:
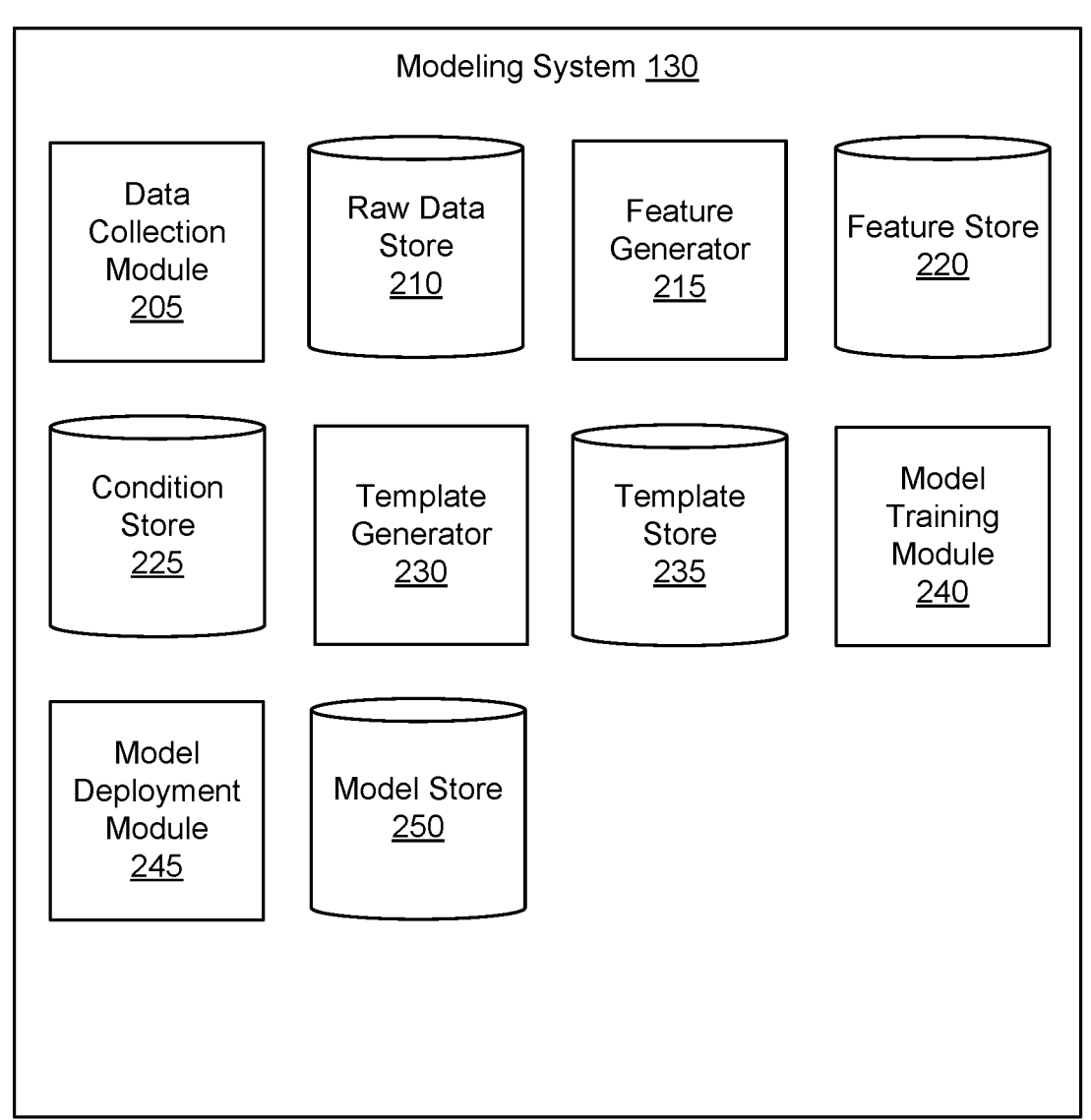
FIG. 2 is a high level block diagram of a system architecture of a modeling system 130, in accordance with an example embodiment.

FIG. 2 is a high level block diagram of a system architecture of a modeling system 130, in accordance with an example embodiment. The modeling system 130 includes various modules and data stores for processing data, storing data, generating models, training the models, and promoting the models to production. The modeling system 130 comprises a data collection module 205, a raw data store 210, a feature generator 215, a feature store 220, a condition store 225, a template generator 230, a template store 235, a model training module 240, a model deployment module 245, and a model store 250. Computer components such as web servers, network interfaces, security functions, load balancers, failover servers, management and network operations consoles, and the like are not shown so as to not obscure the details of the system architecture. Additionally, the modeling system 130 may contain more, fewer, or different components than those shown in FIG. 2 and the functionality of the components as described herein may be distributed differently from the description herein.

The data collection module 205 interfaces with and receives raw data from external sources 115. The raw data can be received in various formats and data schemas. The data collection module 205 stores the received raw data in the raw data store 210. In some embodiments, the data collection module 205 processes some or all of the raw data to prepare the raw data for use by the feature generator 215. For example, the data collection module 205 may preprocess and reformat the raw data for storage in data schemas supported by the raw data store. In some embodiments, the data collection module 205 may additionally add metadata to the raw data, such as annotations about where the raw data came from.

The raw data store 210 stores the raw data received by the data collection module 205. In some embodiments, the raw data store may comprise distributed data store machines. For example, in the healthcare space, large amounts of data can be received from many external sources 115 and at different times the modeling system 130 may require more or less storage space to maintain the raw data store 210. In various embodiments, the raw data store 210 may keep records of received raw data indefinitely. In other cases, the raw data store 210 may store raw data records for a set amount of time before deprecating or deleting them, for example, if certain health records can only be kept for a limited number of years according to regulations in a particular jurisdiction.

The feature generator 215 processes data from the raw data store 210 to prepare features and condition data that can be used to train and apply to machine learning models. The feature generator 215 executes a plurality of scripts that normalize and format the raw data. The scripts for generating features may be run as needed, as additional relevant raw data is received and detected, or on a schedule to keep the available features in the feature store 220 current. In some embodiments, the scripts are built to include domain-specific knowledge for preparing the data. For example, a script for parsing and processing lab data has information for interpreting and saving the relevant lab result and timing information. As another example, a script for parsing and processing member claims data in a health insurance system can determine and reformat information about dates of procedures, member conditions, and costs. The disparate sources of data are normalized and aggregated at a member level. As an example of normalizing the data, a value may be divided by the number of months that a member has been active with a healthcare system (i.e., a user tenure).

To facilitate training of machine learning models, the feature generator 215 can split feature data according to one or more score dates. That is, the feature generator 215 may identify features that fall before a score date for use in training a model and features that fall on or after the score date for use in generating predictions with the model that can then be verified. These dates may be certain standardized dates across the modeling system 130 that are updated periodically, or in some cases the features in the feature store 220 may be sorted by a specified score date at the time they are requested by a data scientist for use in training a model.

The features generated by the feature generator 215 are stored in the feature store 220. The features may include user feature data and/or clinical feature data about individuals, groups, or specific labs or research areas. The feature store is one or more data repositories and may be distributed across a cloud system to support the many features needed by the modeling system 130. In one embodiment, the features of the feature store 220 may be stored and/or registered at a centralized database or registry such that all models and training systems associated with the modeling system 130 can access the features. Such a central registry may be a data storage location that is accessible to a plurality of scripts (i.e., some or all of the scripts from the modeling system 130 can access the registered information). The features are also stored with a standardized format so that all models and training system can easily access and use the features without the need for adjustments. As with the raw data in the raw data store 210, the features in the feature store 220 can have associated timelines for deprecation and deletion, or may be stored indefinitely. The features in the feature store 220 are standardized and normalized features that can be used by any of the models of the modeling system 130. Since features are prepared automatically by the feature generator 215, data scientists developing models for the modeling system 130 do not need to spend large amounts of time formatting individual data pipelines for raw data to be provided as inputs to new models. Instead, the data scientists can focus on selecting the most relevant features for developing a model and can use the prepared features from the feature store 220.

As data scientists work with the modeling system 130, they may encounter situations when a model under development requires an input feature that is not available at the feature store 220. In such situations, the data scientists or other users can develop a script or other rules for preparing the required data features from the raw data. The script or rules developed by the data scientists is submitted using templates to conform to the feature store implementation, reviewed by AI engineers, and may be put into a production schedule for running in the future on the feature generator so that the required feature will be processed and stored in the feature store 220 for future use by other data scientists who may need it for a model.

The condition store 225 stores information about conditions (e.g., medical conditions) that may be useful as inputs to healthcare models in addition to the features in the feature store 220. Conditions in the condition store 225 may be received via the data collection module 205 and processed by the feature generator, or they may be added directly to the condition store 225. The condition data, like the feature data in the feature store 220, is stored in a standardized format that can be recognized and used by any of the models of the modeling system 130. Condition data in the condition store 225 may include information such as symptoms, stages, timelines, and outcomes associated with various conditions. As with the feature store 220, if a data scientist needs condition data that is not stored in the condition store 225 for use by a model under development, the data scientist can add or request the condition data for storage in the condition store 225. In this way, future data scientists who may need the condition information for a model input can easily access the data without additional work.

The template generator 230 generates and formats model templates and feature templates. Data scientists can use model templates to build models efficiently. Having a model template allows the data scientists to focus on the input features and output results when developing features and/or training a model rather than focusing on building the back-end code to support the model. A data scientist interacts with the modeling system 130 via the template generator 230 to generate new model templates, generate new feature templates, and access existing templates for model and feature development. In one embodiment, a template is a script that includes executable code with placeholders that may be edited by a developer. Thus, to use a template, a developer may edit stored template documentation as produced by the template generator 230 to expose functions or other code that is relevant to the use case of the developer. If a model format that is needed by a data scientist is not already available in the template store 235, the data scientist can develop a new template that will work with the standard feature types from the feature store 220. The template store 235 can store various model templates and feature templates in different embodiments. A model template may include a pre-built model architecture to which a data scientist only needs to specify the feature inputs from the feature store 220 and specify the output formats and any training data and expected outcomes for model training and experimentation. Similarly, in some embodiments, the template generator 230 may have templates by which a data scientist can define new features for generation by the feature generator 215.

When a new template is generated for a new type of model or a new class of feature, the template generator stores the new template in the template store 235. The template store stores past and current model and feature templates. Data scientists and other users can access the templates in the template store 235 and use the templates to build models without having to rebuild the entire model architecture from scratch, thus reducing redundancy in an organization. Furthermore, since the templates are structured to use the features from the feature store 220, the template models require little or no adjustments to accept the standardized feature values as inputs.

The model training module 240 generates and trains machine learning models for the modeling system 130. Once a data scientist has built a model from one or more templates in the template store 235 and specified the feature information for the model, the model training module 240 trains the weights of the model using labeled feature data from before a specified score date for the model. The score date may be a specific date, or may be based on a specific event (e.g., normalized for a date that each patient in the data set experienced a broken bone). The trained model is then tested by the model training module 240 using the feature values from after the score date. While a model is in the experimental stage, a data scientist may review the results of the model and adjust the feature values and the model weights and then may retrain the model using the model training module 240 until the model is making accurate predictions and can be put into production. The model training module 240 may also retrain production models periodically or as new data is received. Retraining production models on features from more current data can help models to make accurate predictions for the time period in which they are run.

The model deployment module 245 manages models that are in production. When training or retraining of a model is completed, the trained model weights and any associated metadata for the model are received at the model deployment module 245. The model deployment module 245 stores the model in the model store 250 and manages execution of the model according to a specified execution schedule for the model. A deployment schedule for a model may include timing or event triggers that indicate that scoring and/or monitoring of a deployed model should take place for a future data set. The model deployment module 245 may support various scoring techniques including batch scoring and streaming scoring. In some embodiments, the model deployment module 245 publishes information about accessing results from the active models so that data scientists and other organization members can access and use the model results. For example, if a model predicts a higher likelihood of a condition occurring in a certain population, organization health providers can view the data and reach out to members in that population to offer preventive care.

The production models are stored in the model store 250. In some embodiments, the model store 250 additionally stores the outputs from the models. In alternate embodiments, the model outputs may be stored in separate results databases.

Figure 3:
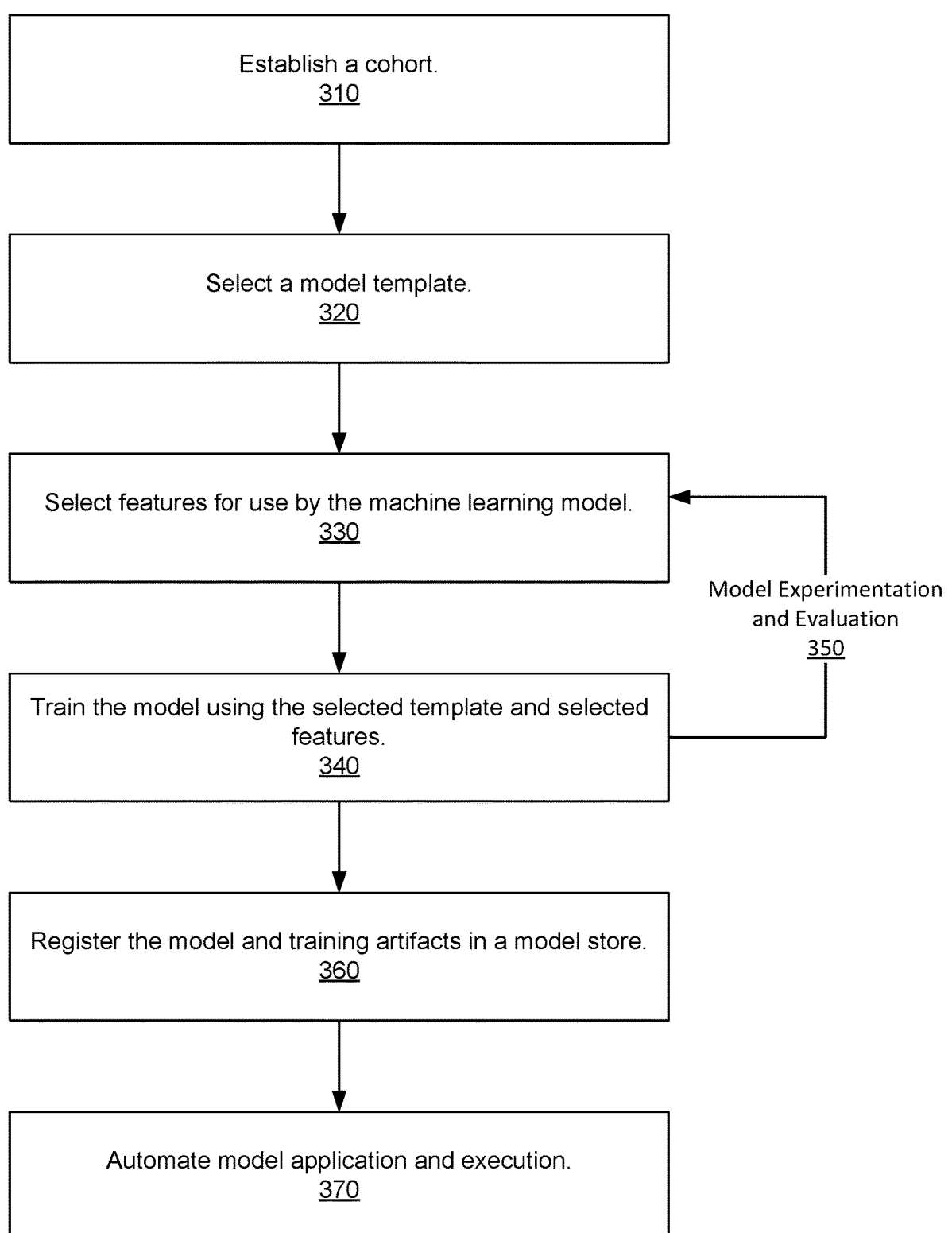
FIG. 3 is a flowchart illustrating a method of creating and deploying reproducible standardized predictive models based on templates using best practices, in accordance with an example embodiment.

FIG. 3 is a flowchart illustrating a method of creating and deploying reproducible standardized predictive models based on templates using best practices, in accordance with an example embodiment. Via the modeling system 130, a data scientist establishes 310 a cohort. That is, a set of organization users, members, or other sample population is selected for evaluation by the model. A model template is selected 320 from the template store 235. The data scientist or other user selects 330 features for use by the machine learning model from the feature store 220 and trains 340 the model using the selected template and the selected features. Depending on the model architecture, the training may comprise training the model using features from before a score date and evaluating the model performance using features from after the score date. The model is evaluated 350 in experimentations in which the weights may be adjusted and/or a data scientist may change the feature values used as inputs by selecting 330 different feature sets and retraining 340 the model until the predictions of the model are effective. Once the model is trained, the modeling system 130 registers 360 the model and training artifacts in a centralized registry (or records the model and training data in the model store 250) and the model deployment module 245 manages automation 370 of the model application and execution to generate predictive values for use by the organization. In some embodiments, a separate configuration or settings file that includes parameters for a model is stored in a centralized location as separate from other scripts associated with the model.

FIG. 4 is a flowchart illustrating a method of producing features for use by the models, in accordance with one example embodiment. The modeling system 130 obtains 410 raw data for feature generation. The raw data is pseudonymized and de-sensitized 420, for example by the data collection module 205. The feature generator 215 applies 430 domain-specific knowledge to the data to normalize the data into features. The feature generator 215 generates 440 a training feature set including the normalized features from before a determined date (e.g. a "score" date) and also generates 450 a prediction feature set including the normalized features from after the determined date (this feature set may also include features that occurred on the determined date). The modeling system 130 stores 460 the training feature set and the prediction feature set in the feature store 220 for future access by the machine learning models.

Figure 5:
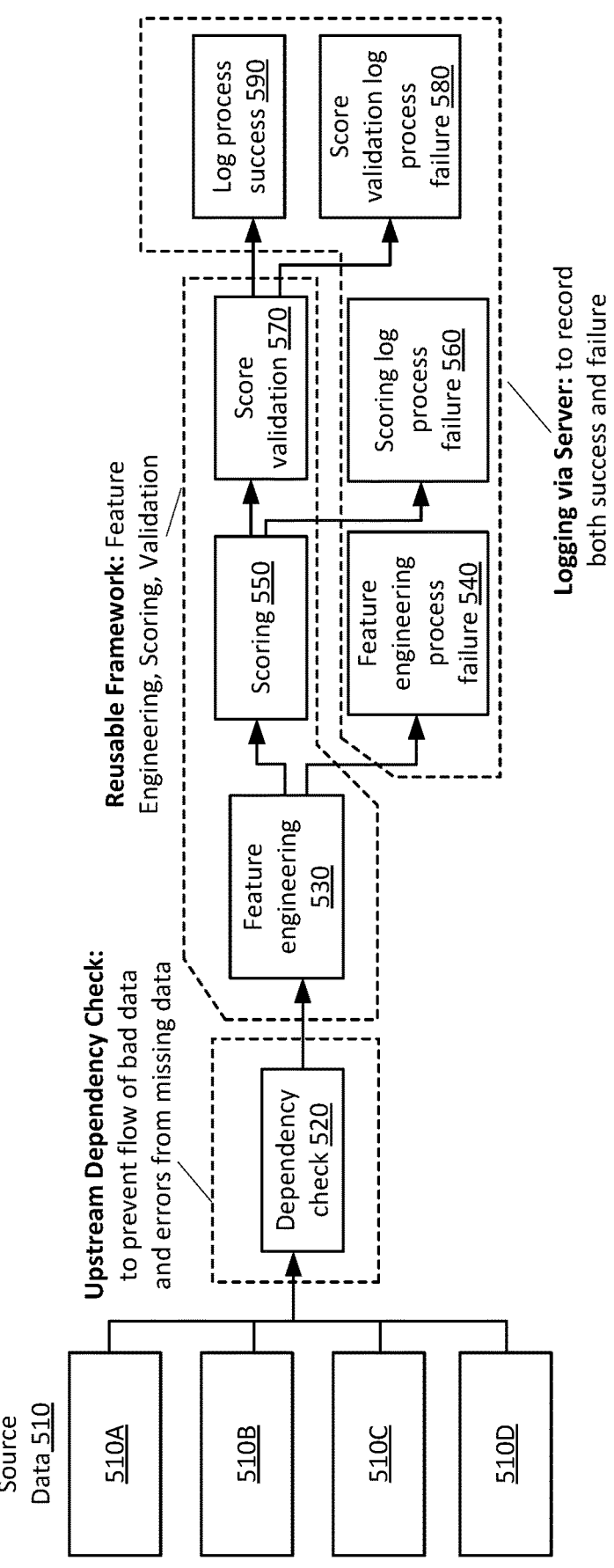
FIG. 5 is a block diagram illustrating a production deployment pipeline, in accordance with an example embodiment.

FIG. 5 is a block diagram illustrating a production deployment pipeline, in accordance with an example embodiment. Source data 510 is obtained by the modeling system 130. At an upstream dependency check, 520, the modeling system 130 checks whether the source data is up-to-date and appropriately formatted before it can be used in execution of a model. For example, the data collection module 205 and the feature generator 215 may collect and process the source data 510. The upstream dependency check 520 also ensures that all the data that is required for the process (e.g., model execution) is available before the process is executed. In one embodiment, each model is set up with three main steps of feature engineering 530, scoring 550, and score validation 570. At the feature engineering 530 step, the model reads in features from the feature store 220 and also generates any custom features that may be required for the model. At the scoring step 550, the model is applied to the prepared data (e.g., by the model deployment module 245). The score validation step 570 generates basic statistics about the distribution of values resulting from the model predictions and the content of different outputs. If at any of the steps, an output is not within an expected range or any error in the software occurs, the modeling system 130 logs a process failure, for example a feature engineering process failure 540, a scoring process failure 560, and a score validation process failure 580. These logs use a data base (e.g., a SQL server that records failures or success of the processes). If there are no failures, then a database logs the process success 590 indicating that the model ran successfully. The process failure logs can be used by data scientists to reevaluate the production models to determine if a process needs to be refreshed (e.g., if a model has drifted) or updated to handle new data (e.g., if source data has changed to break the implementation of the model).

Figure 6:
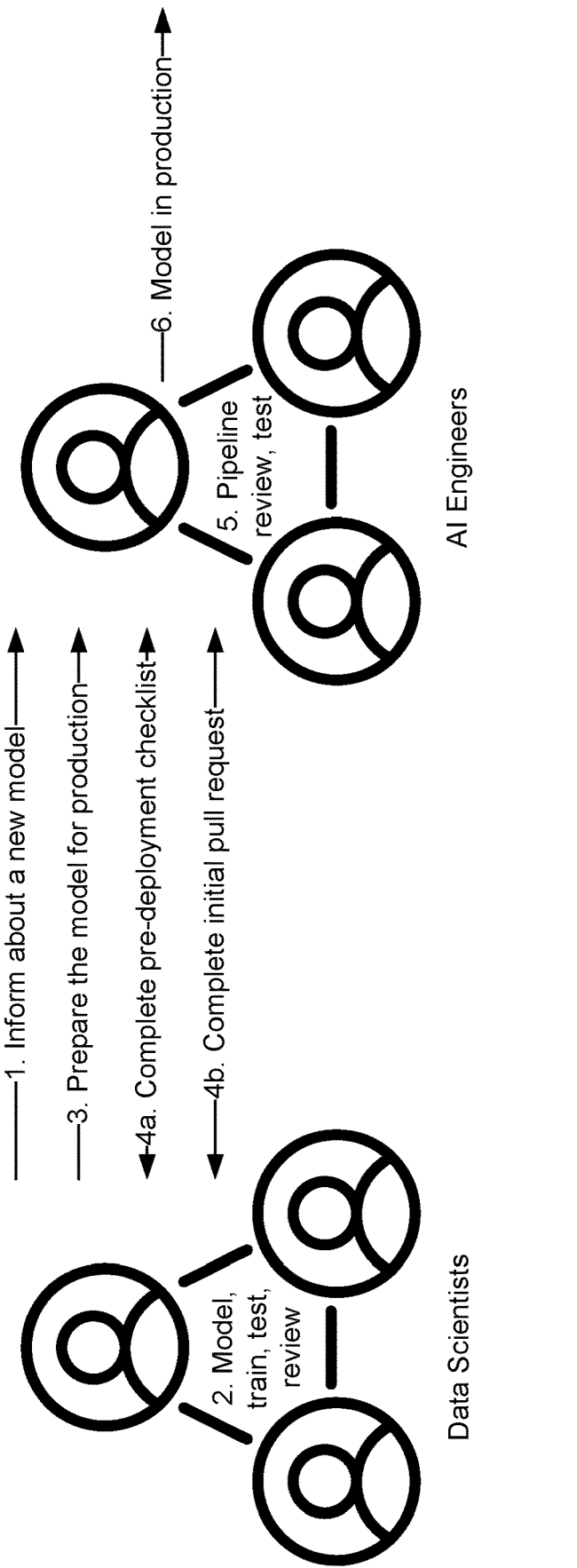
FIG. 6 is a diagram illustrating interactions between data scientists and AI engineers during model generation, in accordance with an example embodiment.

FIG. 6 is a diagram illustrating interactions between data scientists and AI engineers during model generation, in accordance with an example embodiment. At step 1, the data scientists inform the AI engineers about plans for a new model. At step 2, the data scientists use the modeling system 130 to develop, train, test, and review the new model. At step 3, the data scientists prepare the new model for production. At steps 4A and 4B, the data scientists and AI engineers complete a pre-deployment checklist and an initial pull request for the model. At step 5, the AI engineers review and test the model and prepare it for deployment on the modeling system 130. At step 6, the model is put into production.

Framework and Data Pipeline

The feature store and templates for models facilitate a self-service framework for creating and deploying reproducible, standardized predictive models and derived analytical components. The models and components are based on templates to automatically incorporate and ensure standards and best practices are followed. In various embodiments, the framework includes experiment tracking during model training, general logging of models and datasets, upstream dependency management, validation and monitoring of outputs from datasets and models, bias checks for model fairness, and row-level feature importance for model scores.

The framework enables best practices across all end-users of the modeling system and keeps code and output consistently formatted to enable the use of shared utilities. Additionally, the use of the framework breaks the typical hand-off between data scientists and AI engineers and makes it possible for all parties to follow development and deployment throughout the process, thus eliminating significant duplication of efforts, reformatting of code, and production delays and further minimizing the introduction of errors that would otherwise be introduced during the translation of testing and development code bases to the production code. Since the feature generation and model development are supported by templates, data scientists who may be new to an organizations suite of tools are empowered to accelerate their learning and apply theoretical concepts without needing as much technical background for successful implementation of the models. Finally, the self-service framework speeds up the model generation process by automating tedious repetitive operations that would otherwise take up a large portion of time of the end user.

Automated Feature Generation

The system obtains source data from a wide variety of different domains and generates standardized sets of features that can be reused for both training models and for using models in production. This allows data scientists to have prepared historical data for standard features so that they can focus their time on preparing custom features that are specific to a new model instead of having to generate all features each time. Feature generation is automated in that once instructions for generating a feature from raw data are developed and deployed, the modeling system can update the feature store by regenerating new features according to a schedule. This automation generates both training features from historical data to be used for training purposes as well as current features to be used in production models. In some embodiments, the modeling system can further provide ratings and other metadata associated with features to inform users of quality and freshness of data.

Implementation of automated feature generation makes it possible to pre-compute features for an entire population. Since the same algorithms are used to prepare features for training as for production, unexpected errors related to differences in formatting at various input stages are avoided. This means that existing and future models can share the use of features in the feature store and also makes it possible to simulate past outputs from historical data on current or past models without the need to reformat the features.

Custom Feature Store Combinations

The modeling system includes a self-service capability to generate custom combinations of features from the feature store. In some embodiments, a user of the modeling system can select key events, dates, and/or times for a feature set to be focused around (e.g., a user may require a particular scoring date for training and testing a certain model. Users can generate feature combinations with these sorts of customizations using the feature templates without losing the benefit of consistent formatting.

The self-service feature generation capability extends automated feature store generation to cover unknown or custom scenarios. It also empowers end users to generate their own features using the same validated code and formatting that is used in automatic feature generation for the feature store.

Data Lineage Tracking

In some embodiments, the modeling system is configured to track and accumulate data lineage information for some or all of its processes. Lineage tracking enables processes to be traced back to original sources in a graph-style format so that a network diagram can be produced for any dataset showing the upstream inputs.

A lineage tracing system establishes an audit train for any process within the platform. This allows users to identify exact sources used to form the derived inputs to models.

Dependency Management

In some embodiments, the modeling system is configured to automatically pause processes when certain requirements are unmet, and to automatically resume the processes when the requirements are subsequently met. This dependency management ensures that processes only execute once all prerequisites are completed and current.

Key benefits of the dependency management system are that bad or out-of-date data is not propagated into the modeling system. Since the modeling system automatically resumes processes once the criteria are met, a production support burden is decreased significantly because AI engineers and other users do not need to manually oversee pauses and resumption in model use. Furthermore, this allows the modeling system to easily update changes as processes are modified and improved.

Feature Feedback Loop and Retraining a Model

The modeling system may support a mechanism for automatically retrieving data about real outcomes from end users and comparing the data to predicted outcomes, in some embodiments. The information from the comparison can then be used to generate new features for consideration when retraining one or more models.

The automatic feedback loop allows the modeling system to take past performance of production models into consideration and use the results as inputs for developing and refining further versions of the models.

Automatic Source Data Preparation

In one embodiment, the modeling system is configured to automatically prepare raw source data such that sensitive data is excluded. A schedule of validation checks ensures that data meets certain criteria before it can be used on the platform. The preparation may include pseudonymization and de-sensitization among other checks and pre-processing steps.

Automatic data cleaning ensures consistency and best practices across all datasets moved to the machine learning platform. The data ingestion pipeline is fully automatic and handles all aspects of the data delivery, auditing, and logging without any interventions. This automatic pre-processing step also makes it possible for the modeling system to ingest huge amounts of data as the platform scales up because the data sets do not need to be individually inspected by users. Finally, the automation of the source data preparation enables best practices and consistency around storage formats and data compression techniques.

Conclusion and Hardware

Figure 7:
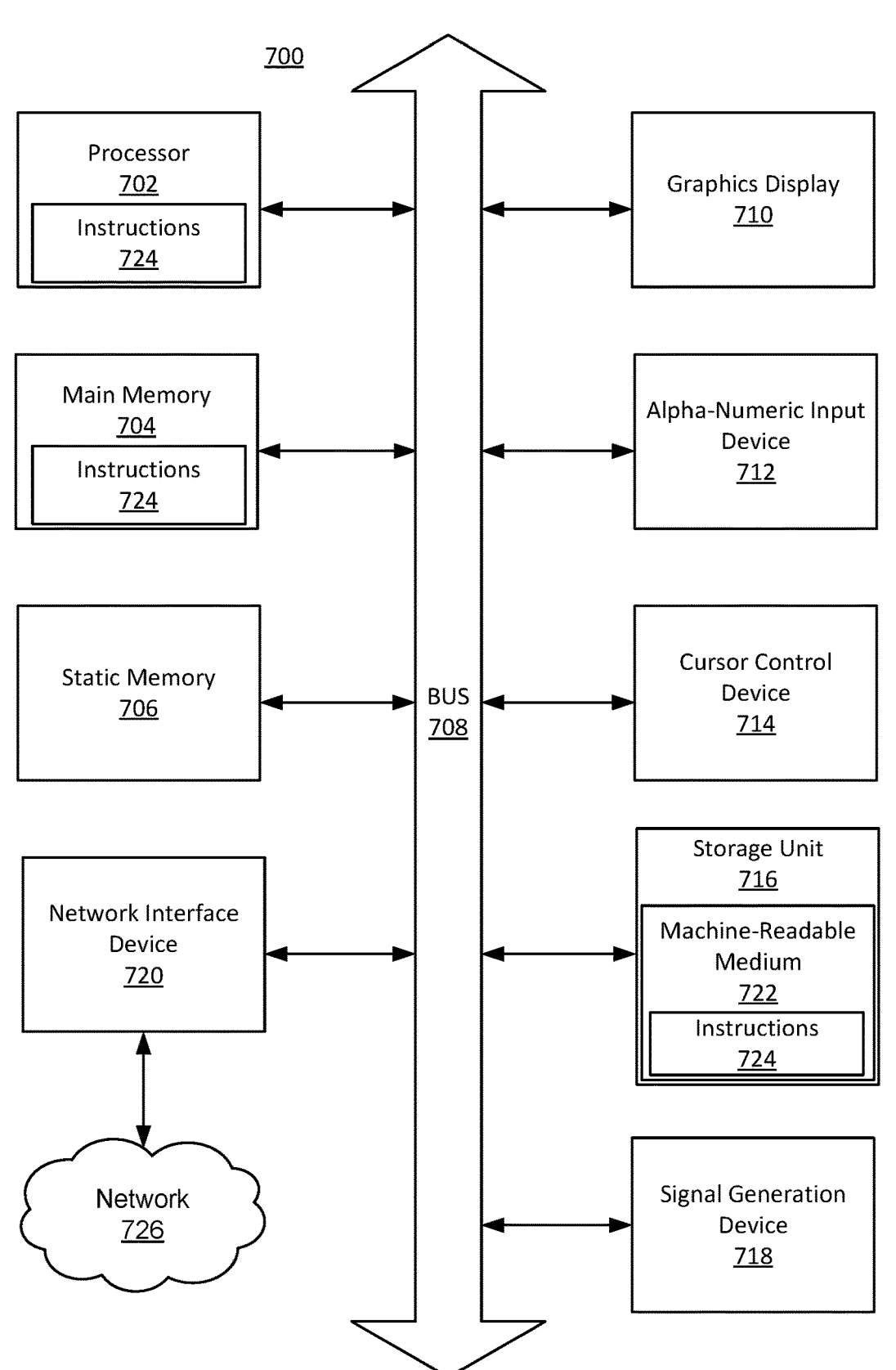
FIG. 7 is a block diagram illustrating components of an example machine able to read instructions from a machine-readable medium and execute them in one or more processors.

FIG. 7 is a block diagram illustrating components of an example machine able to read instructions from a machine-readable medium and execute them in one or more processors (or controllers). Specifically, FIG. 7 shows a diagrammatic representation of the modeling system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 706 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the data collection module 205, raw data store 210, feature generator 215, feature store 220, condition store 225, template generator 230, template store 235, model training module 240, model deployment module 245, and model store 250. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for generating a standardized predictive model, the method comprising:

selecting a set of input features from a generated and standardized feature set, the generated and standardized feature set being stored in a centralized feature store accessible to a plurality of models and comprising (i) a training feature set including normalized features from before a score date and (ii) a prediction feature set including normalized features from on or after the score date;

designating input and output formats for the predictive model;

generating a set of templates for training, scoring, and monitoring the predictive model using a template generator to output model templates and feature templates having executable placeholders for specifying the selected input features and the designated output formats;

performing one or more model training experiments to generate a set of trained models, including training using the training feature set and evaluating using the prediction feature set;

identifying a preferred predictive model from the set of trained models to be used in production;

registering the identified preferred predictive model in a central registry that (i) is accessible to a plurality of scripts, (ii) records trained model artifacts, including model weights, and (iii) separately registers a configuration file comprising configuration parameters for the identified preferred predictive model; and automating a regular scoring and monitoring of the identified preferred predictive model by scheduling production executions on future data sets and, for each execution, performing (i) an upstream dependency check of required inputs and (ii) a score validation of outputs with centralized success/failure logging.

2. The computer-implemented method of claim 1, wherein generating the set of templates for training, scoring, and monitoring the predictive model comprises editing stored template documentation to expose relevant functions.

3. The computer-implemented method of claim 1, wherein a template includes executable code with placeholders that is edited by a developer.

4. The computer-implemented method of claim 1, wherein the selected set of input features are selected from a feature store that includes user feature data.

5. The computer-implemented method of claim 4, wherein the feature store includes data sets for features that are updated daily and data sets for features that are updated monthly.

6. The computer-implemented method of claim 1, wherein registering the identified preferred predictive model in the central registry comprises storing the identified preferred predictive model in a data storage location that is accessible to the plurality of scripts.

7. The computer-implemented method of claim 1, wherein automating the regular scoring and monitoring of the identified preferred predictive model comprises scheduling deployment of the identified preferred predictive model to be applied to future data sets.

8. The computer-implemented method of claim 1, wherein automating the regular scoring and monitoring of the identified preferred predictive model comprises deploying the identified preferred predictive model to a centralized production workspace.

9. The computer-implemented method of claim 1, further comprising registering the configuration file including the configuration parameters for the identified preferred predictive model in a separate centralized location.

10. The computer-implemented method of claim 1, wherein the scripts used to maintain and deploy the identified preferred predictive model are stored independently from the identified preferred predictive model, and wherein the scripts used to maintain the identified preferred predictive model are accessible for use by a plurality of trained machine learning models.

* * * * *